US009090149B1

(12) United States Patent
Binfet et al.

(10) Patent No.: US 9,090,149 B1
(45) Date of Patent: Jul. 28, 2015

(54) CONVERTIBLE SYSTEM FOR A VEHICLE

(71) Applicants: Honda Motor Co., Ltd., Tokyo (JP);
Magna Car Top Systems of America, Inc., Auburn Hills, MI (US)

(72) Inventors: Michael T. Binfet, Bellefontaine, OH (US); Jason S. Borland, Marysville, OH (US); Nigel Williams, Raymond, OH (US); Kenneth M. Hartlaub, Powell, OH (US); James A. Loftus, Jr., Marysville, OH (US); Kenneth David Edelmann, Rochester, MI (US); Michael T. Willard, Harrison Township, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/209,830

(22) Filed: Mar. 13, 2014

(51) Int. Cl.
*B60J 7/12* (2006.01)
(52) U.S. Cl.
CPC ..................................... *B60J 7/1265* (2013.01)
(58) Field of Classification Search
CPC ............ B60J 7/0053; B60J 7/06; B60J 7/061; B60J 7/1851; B60J 7/1853; B60J 7/20; B60J 7/1265
USPC ............................. 296/121, 223, 219, 107.08, 296/107.16–107.19, 107.07, 146.14, 116, 296/117
See application file for complete search history.

(56) References Cited

U.S. PATENT DOCUMENTS

| | | | | |
|---|---|---|---|---|
| 5,018,783 A | * | 5/1991 | Chamings et al. | 296/219 |
| 5,045,765 A | * | 9/1991 | Wissler | 318/382 |
| 5,242,210 A | * | 9/1993 | Fujisawa et al. | 296/219 |
| 5,310,241 A | * | 5/1994 | Omoto et al. | 296/219 |
| 5,558,388 A | | 9/1996 | Fürst | |
| 5,769,483 A | | 6/1998 | Danzl et al. | |
| 6,398,296 B1 | | 6/2002 | Mayer | |
| 6,419,296 B2 | * | 7/2002 | Dintner et al. | 296/107.18 |
| 6,485,094 B2 | | 11/2002 | Corder et al. | |
| 6,945,590 B2 | | 9/2005 | Doncov et al. | |
| 7,156,446 B2 | | 1/2007 | Perakis | |
| 7,240,960 B2 | * | 7/2007 | Fallis et al. | 296/218 |
| 7,416,247 B2 | | 8/2008 | Dunneback et al. | |
| 7,441,825 B2 | | 10/2008 | Queveau et al. | |
| 7,591,500 B2 | | 9/2009 | Bunsmann et al. | |
| 7,735,900 B2 | | 6/2010 | Russke et al. | |
| 7,819,460 B2 | * | 10/2010 | Lewis et al. | 296/107.11 |
| 7,832,784 B2 | * | 11/2010 | Cimatti et al. | 296/107.09 |
| 7,909,385 B2 | | 3/2011 | Russke | |
| 8,132,841 B2 | | 3/2012 | Steuernagel et al. | |
| 8,205,929 B2 | | 6/2012 | Ugolini et al. | |
| 8,366,174 B2 | | 2/2013 | Hilbk | |
| 2006/0290164 A1 | | 12/2006 | Bunsmann | |
| 2007/0210610 A1 | | 9/2007 | Bunsmann et al. | |
| 2010/0230995 A1 | | 9/2010 | Hilbk | |

* cited by examiner

*Primary Examiner* — Dennis H Pedder
(74) *Attorney, Agent, or Firm* — Rankin, Hill & Clark LLP

(57) ABSTRACT

A convertible system includes a pair of movable side rails, each being connected to a structural pillar. A front header spans between forward ends of the side rails. A side rail latching mechanism releasably attaches the side rails to the structural pillars. A roof member includes a flexible, foldable roof panel and a panel header secured to and covered by the roof panel. The panel header has lateral end portions movably coupled to the side rails. The roof member is movable between a closed position, a pre-defined intermediate opened position, and a fully opened position. The roof member together with the side rails is further movable to a stowed position rearward of a vehicle occupant cabin. A roof member latch mechanism is mounted to the panel header for releasably attaching the panel header to the front header.

17 Claims, 15 Drawing Sheets

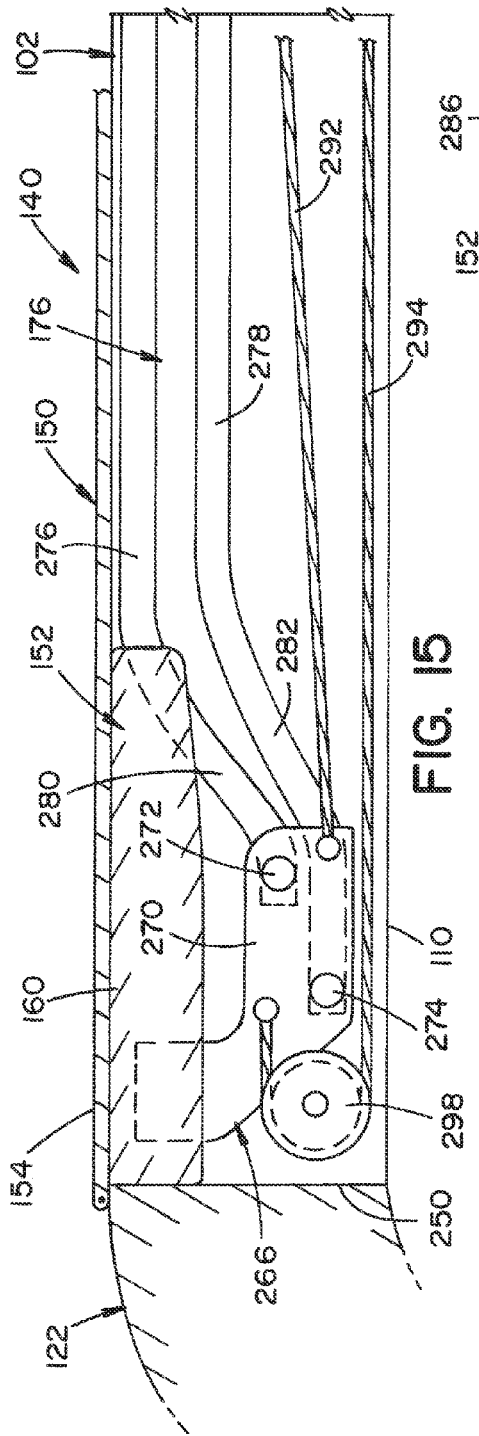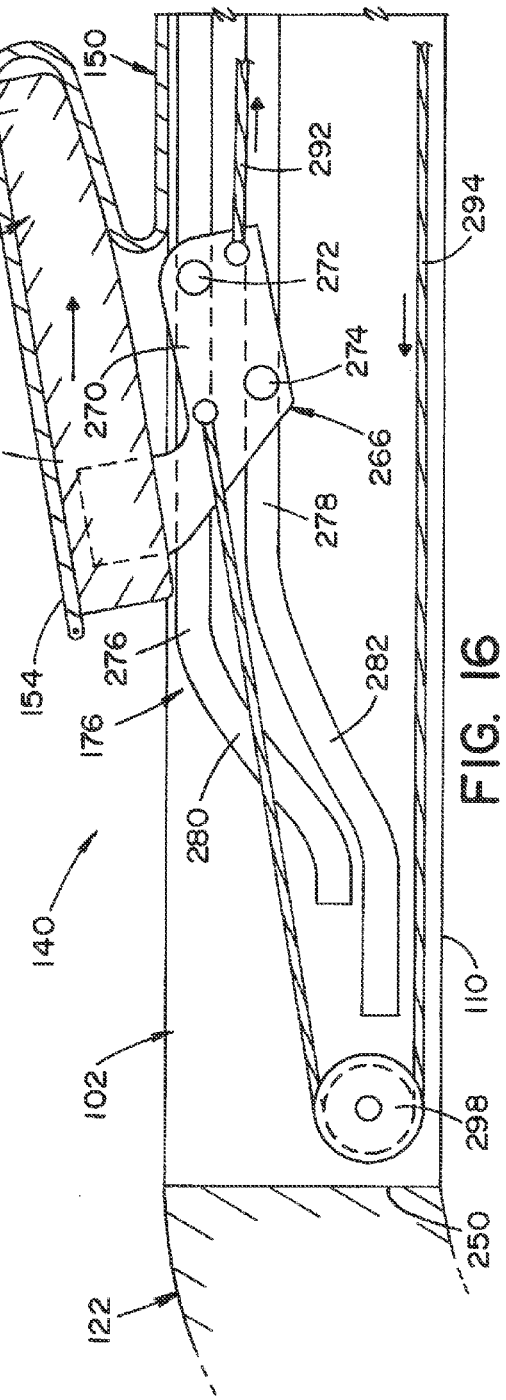

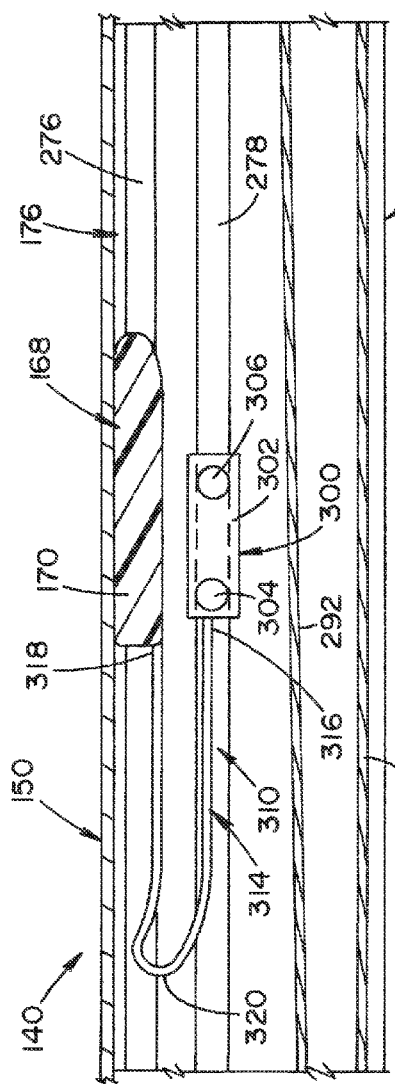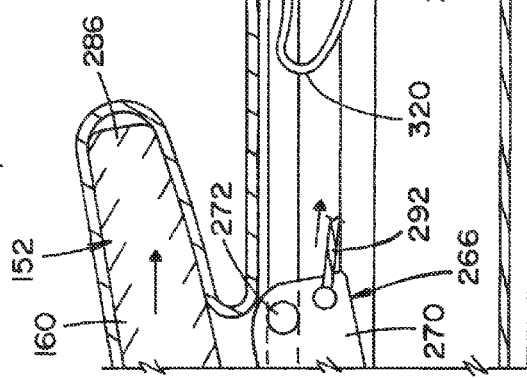

CONVERTIBLE SYSTEM FOR A VEHICLE

BACKGROUND

It has become desirable to maximize the open air or open roof space above the passenger compartment, and it is common in the automotive industry to employ a convertible roof which is movable from a closed position above a passenger compartment to a retracted position. It is also known to provide movable tonneau covers to cover the stowed convertible roof. By way of example, a known convertible system can include a displaceable roof that can be opened as a whole in relation to its opening. The displaceable roof can include a sunroof that can be displaced in relation to a surrounding roof part when the roof is in the closed position. With this known system, it is possible to directly open the roof from closed position when the sunroof is open as well as from a closed position when the sunroof is closed. Another traditional vehicle convertible system employs a flexible fabric roof which can be closed by manually snapping or otherwise attaching the fabric roof to stationary roof rails and a front header. This fabric roof can also be manually rolled up to expose fully the passenger compartment between the roof rails.

BRIEF DESCRIPTION

In accordance with one aspect, a convertible system for a vehicle comprises a pair of movable structural side rails, each side rail being connected at a forward end to a structural pillar of a vehicle body. A front structural header spans between the forward ends of the side rails. The side rails together with the front structural header define a roof opening. A side rail latching mechanism is mounted to at least one side rail for releasably attaching the forward end of the at least one side rail to one of the structural pillars. A roof member includes a flexible, foldable roof panel sized to cover the roof opening and a panel header secured to and covered by a forward end portion of the roof panel. The panel header has lateral end portions movably coupled to the side rails. The roof member is movable between a closed position, at least one pre-defined intermediate opened position, and a fully opened position. The roof member together with the pair of side rails are further movable to a stowed position rearward of a vehicle occupant cabin. A roof member latch mechanism is mounted to the panel header for releasably attaching the panel header to the front structural header.

In accordance with another aspect, a convertible system for a vehicle comprises a pair of movable structural side rails, each side rail being connected at a forward end to a structural pillar of a vehicle body. A front structural header spans between the forward ends of the side rails and a rear roof support spans between and is connected to rear end portions of the side rails. The side rails together with the front structural header and rear roof support define a roof opening. A side rail latching mechanism is mounted to each side rail for releasably attaching the forward end of each side rail to one of the structural pillars. A retractable roof member includes a foldable textile roof panel sized to cover the roof opening and a panel header secured to and covered by a forward end portion of the roof panel and movably coupled to the side rails. The roof member is movable between a closed position, at least one pre-defined intermediate opened position, and a fully opened position. The roof member together with the pair of side rails and the rear roof support are further movable to a stowed position rearward of a vehicle occupant cabin. A roof member latch mechanism is mounted to the panel header for releasably attaching the panel header to the front structural header. A drive mechanism is mounted to the rear roof support and is configured to retract the roof member. The roof panel is compactly folded substantially beneath the panel header as the roof member is retracted.

In accordance with yet another aspect, a convertible system for a vehicle comprises a pair of movable structural side rails, each side rail being connected at a forward end to a structural pillar of a vehicle body. A front structural header spans between the forward ends of the side rails and a rear roof support spans between and is connected to rear end portions of the side rails. The side rails together with the front structural header and rear roof support define a roof opening. A side rail latching mechanism is mounted to each side rail for releasably attaching the forward end of each side rail to one of the structural pillars. A retractable roof member includes foldable textile roof panel sized to cover the roof opening and a panel header secured to and covered by a forward end portion of the roof panel and movably coupled to the side rails. The roof member is movable between a closed position, at least one pre-defined intermediate opened position, and a fully opened position. The roof member together with the pair of side rails and the rear roof support are further movable to a stowed position rearward of a vehicle occupant cabin. A transverse roof support is movably coupled to the side rails. The panel header operably engages the transverse support when the roof member is retracted causing the transverse support to move substantially simultaneous with the panel header. The transverse support at least partially lifts the panel header allowing the roof panel to be compactly folded substantially beneath the panel header. A roof member latch mechanism is mounted to the panel header for releasably attaching the panel header to the front structural header. A drive mechanism is mounted to the rear roof support and is configured to retract the roof member. At least one position sensor is located on at least one side rail for determining whether the roof member is in the at least one pre-defined intermediate opened position. The at least one position sensor is operably connected to the drive mechanism so that the drive mechanism automatically stops movement of the roof member at the at least one pre-defined intermediate opened position.

BRIEF DESCRIPTION OF THE DRAWINGS

FIG. 15 is a cross-sectional view of the convertible system taken along line 15-15 of FIG. 12.

FIG. 16 is a cross-sectional view of the convertible system taken along line 16-16 of FIG. 12.

FIG. 17 is a cross-sectional view of the convertible system taken along line 17-17 of FIG. 12.

FIG. 18 is a cross-sectional view similar to FIG. 17, but showing movement of a transverse support member the exemplary convertible system.

DETAILED DESCRIPTION

Figure 1:
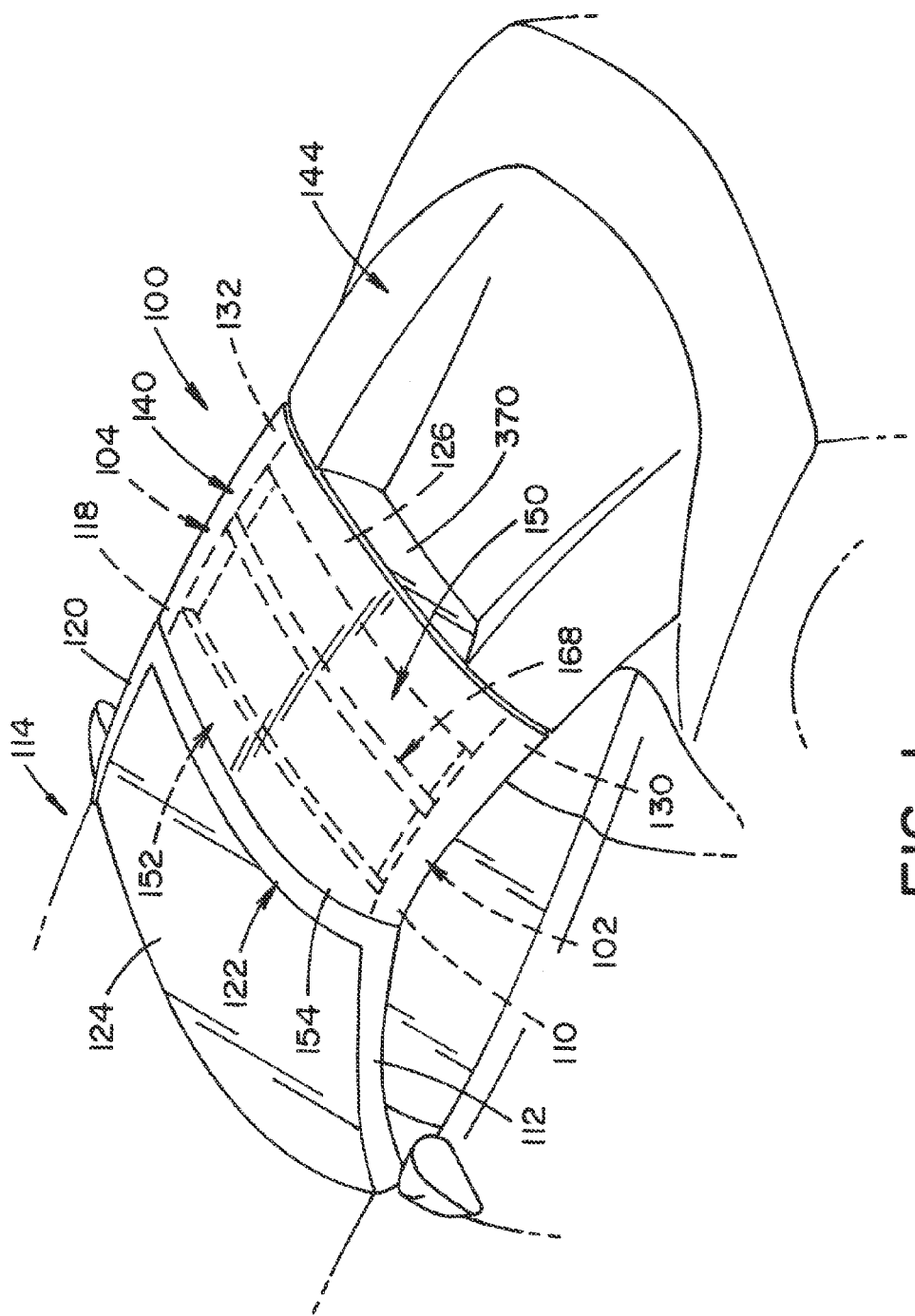
FIG. 1 is a schematic perspective view of a vehicle having an exemplary convertible system according to the present disclosure in a closed position.

It should, of course, be understood that the description and drawings herein are merely illustrative and that various modifications and changes can be made in the structures disclosed without departing from the present disclosure. In general, the figures of the exemplary convertible system for a vehicle are not to scale. For purposes of understanding, the term "signal" utilized herein is defined as any electrical signal or any stored or transmitted value. It will also be appreciated that the various identified components of the exemplary convertible system for a vehicle disclosed herein are merely terms of art that may vary from one manufacturer to another and should not be deemed to limit the present disclosure.

As used herein, lateral directions are transverse across the vehicle, i.e., left and right directions. Likewise, longitudinal directions refer to forward and rearward directions of vehicle travel, and the vertical directions relate to elevation, i.e., upward and downward directions. Referring now to the drawings, wherein like numerals refer to like parts throughout the several views, FIGS. 1-4 schematically illustrate an exemplary convertible system 100 for a vehicle. The convertible system 100 includes a pair of laterally spaced, movable structural side rails 102, 104. Side rail 102 is connected at a forward end 110 to a structural pillar (i.e., A-pillar 112) of a vehicle body 114, and side rail 104 is connected at a forward end 118 to a structural pillar (i.e., A-pillar 120) of the vehicle body 114. A front structural header 122 of the vehicle body 114 spans between the forward ends 110, 118 of the respective side rails 102, 104 and is located immediately above a front windshield 124. A rear roof support 126 spans between and is connected to respective rear end portions 130, 132 of the side rails 102, 104. The side rails 102, 104 together with the front structural header 122 and rear roof support 126 define a roof opening 138.

Figure 2:
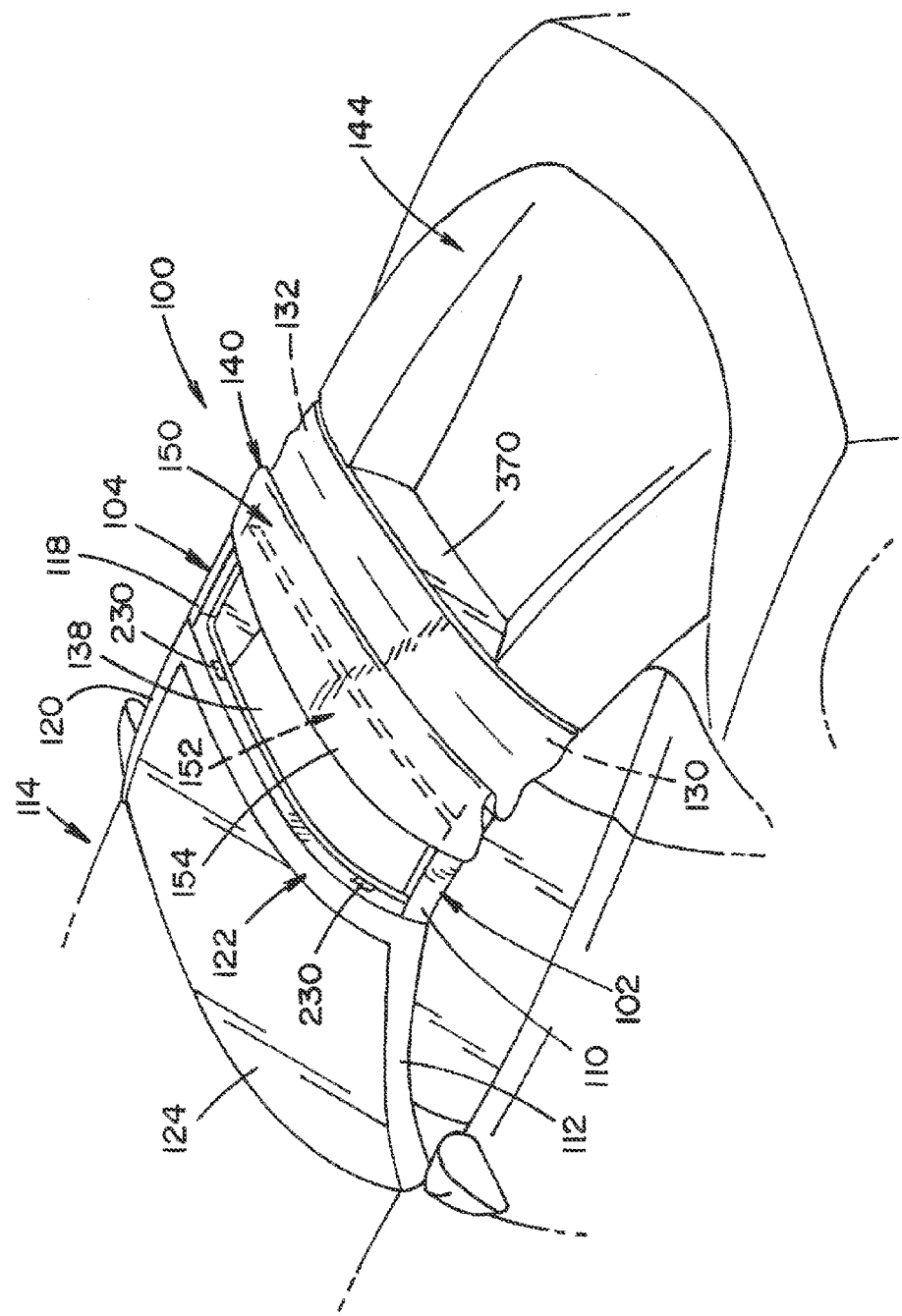
FIG. 2 is a schematic perspective view of a roof member of the exemplary convertible system of FIG. 1 in a pre-defined intermediate opened position.
Figure 3:
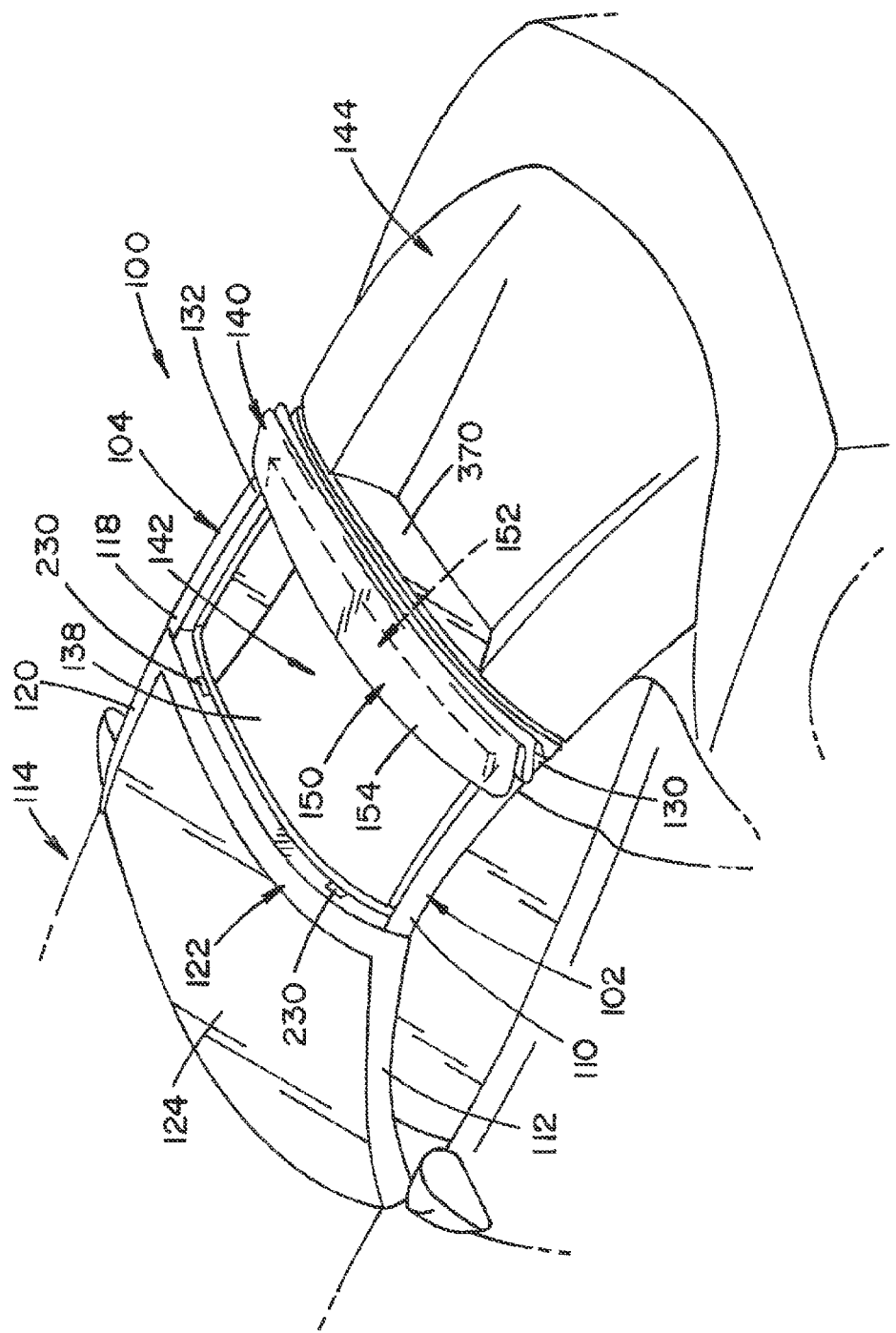
FIG. 3 is a schematic perspective view of the roof member of the exemplary convertible system of FIG. 1 in a fully opened position.
Figure 4:
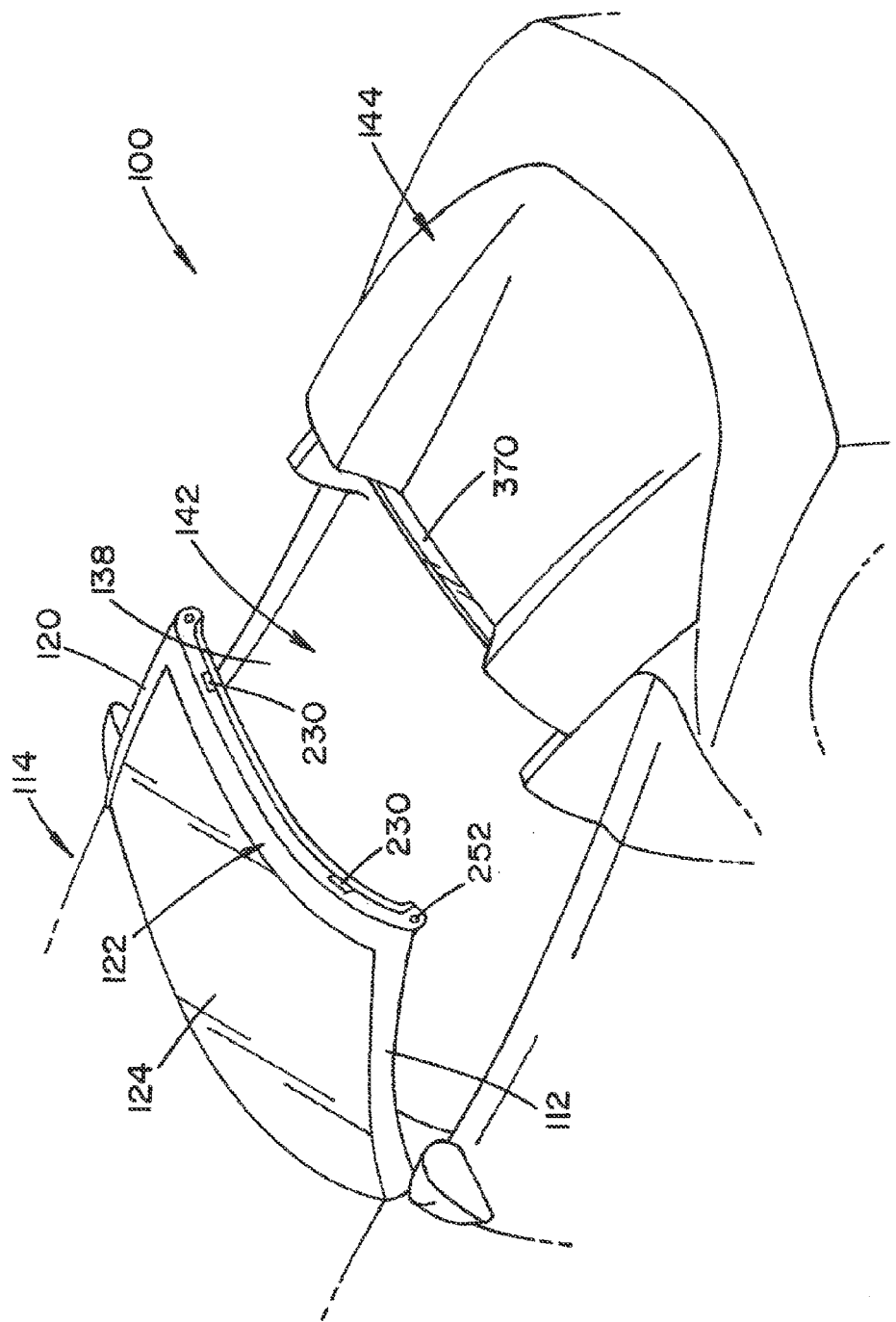
FIG. 4 is a schematic perspective view of the exemplary convertible system of FIG. 1 in a stowed position.
Figure 5:
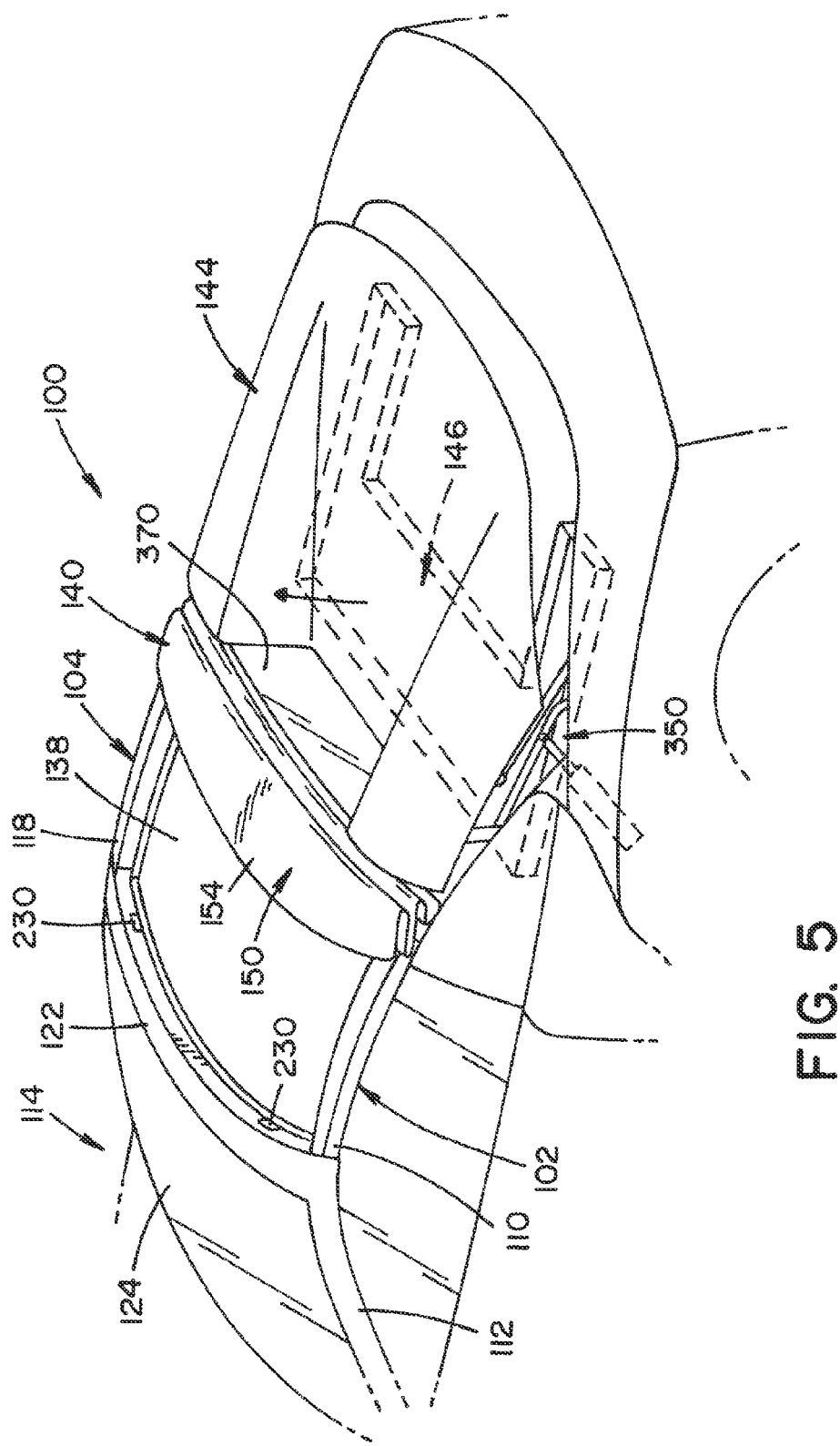
FIGS. 5-7 are schematic perspective views of the exemplary convertible system depicting movement of an exemplary tonneau cover from a closed position to a fully opened position.
Figure 6:
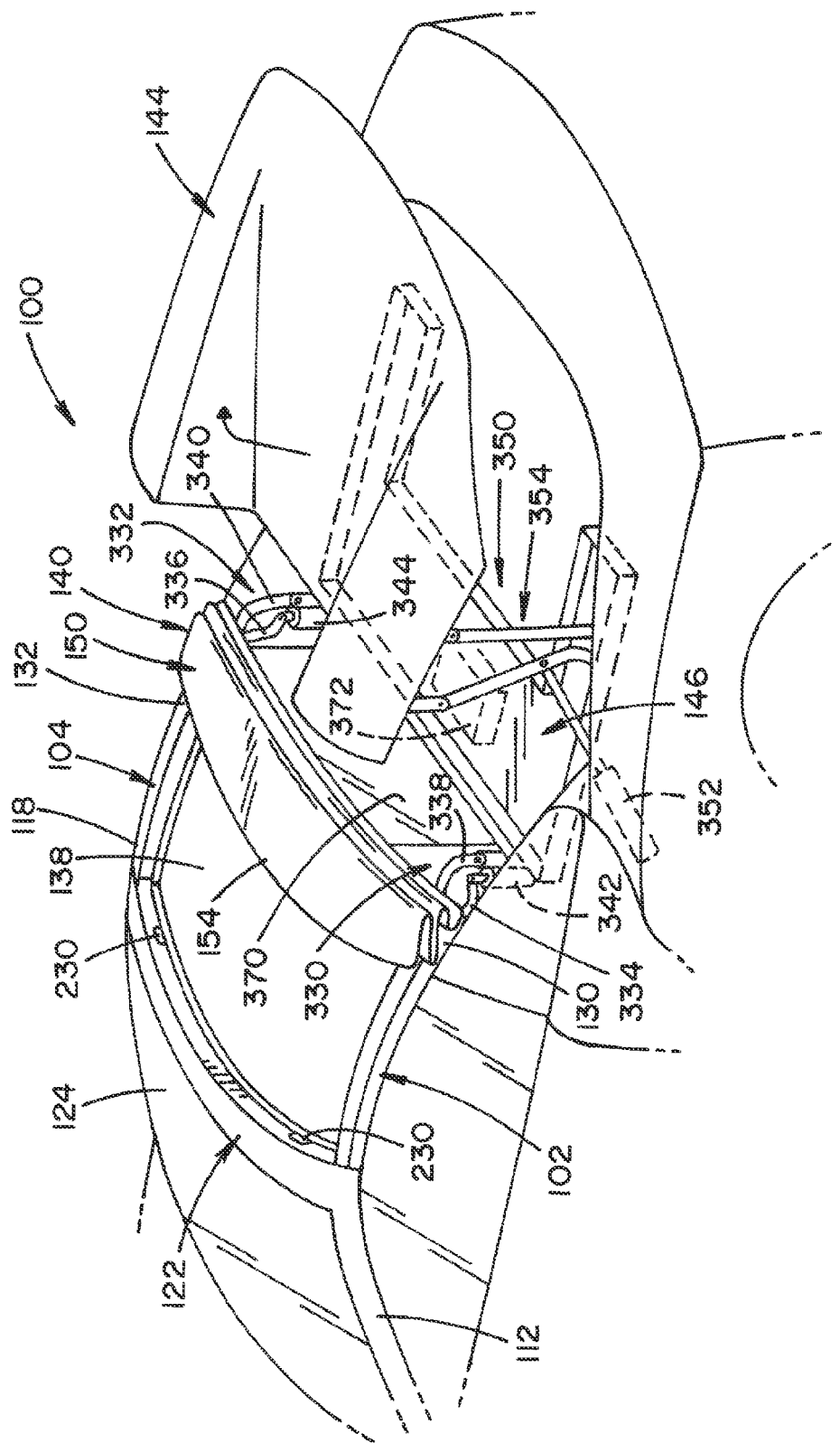
Figure 7:
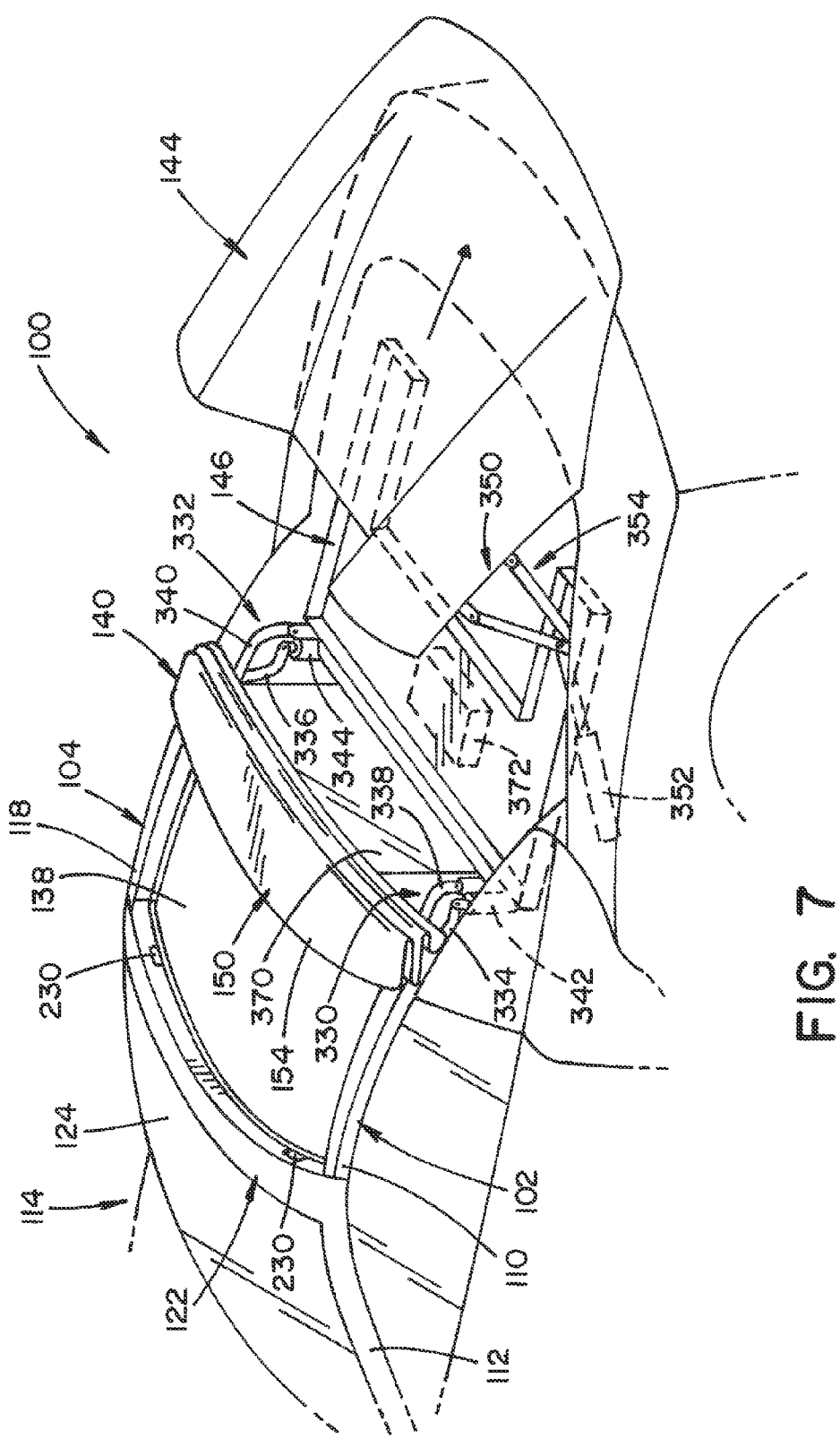
Figure 8:
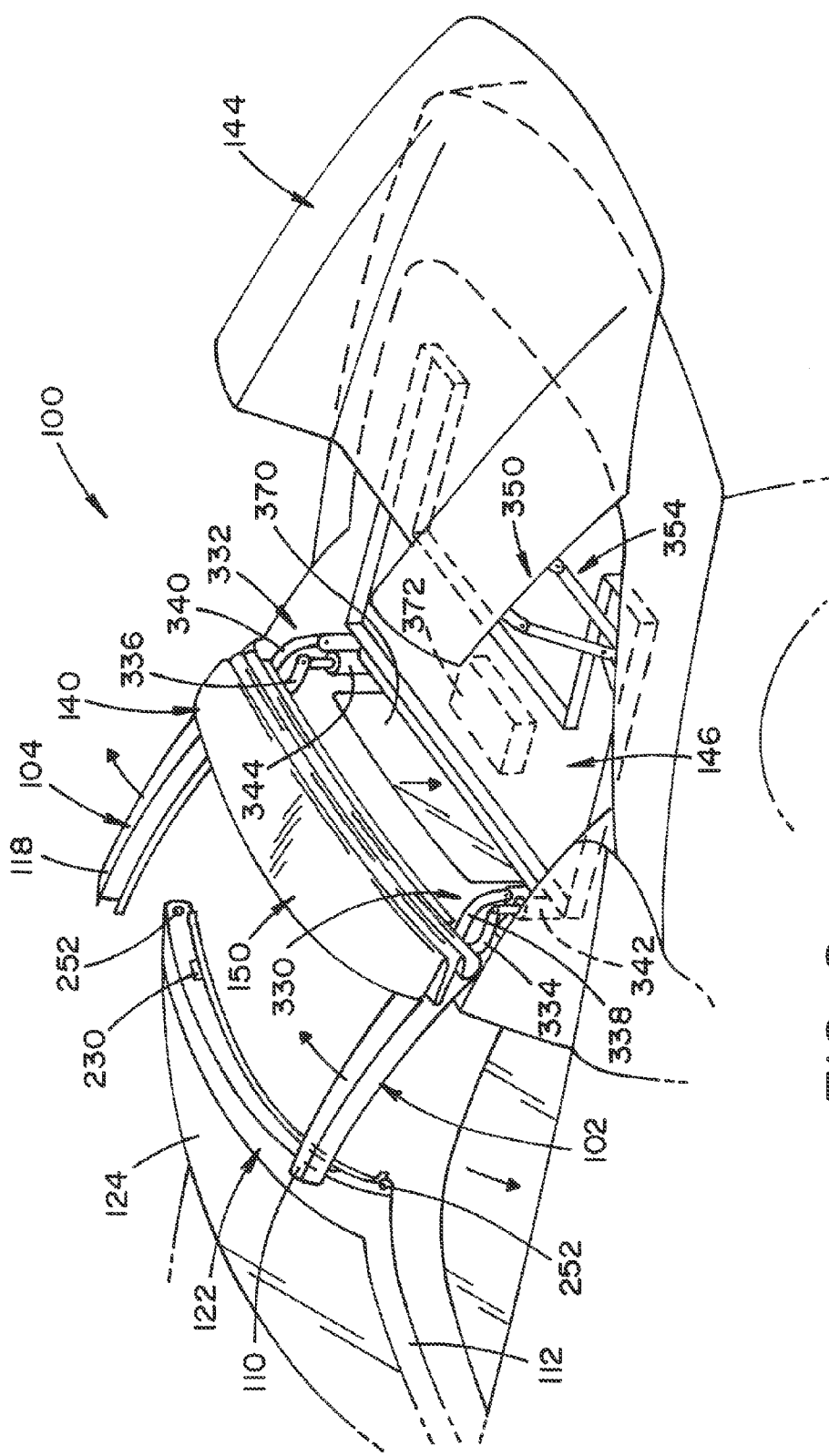
FIGS. 8-11 are schematic perspective views of the exemplary convertible system depicting movement of the roof member together with side rails to the stowed position.
Figure 9:
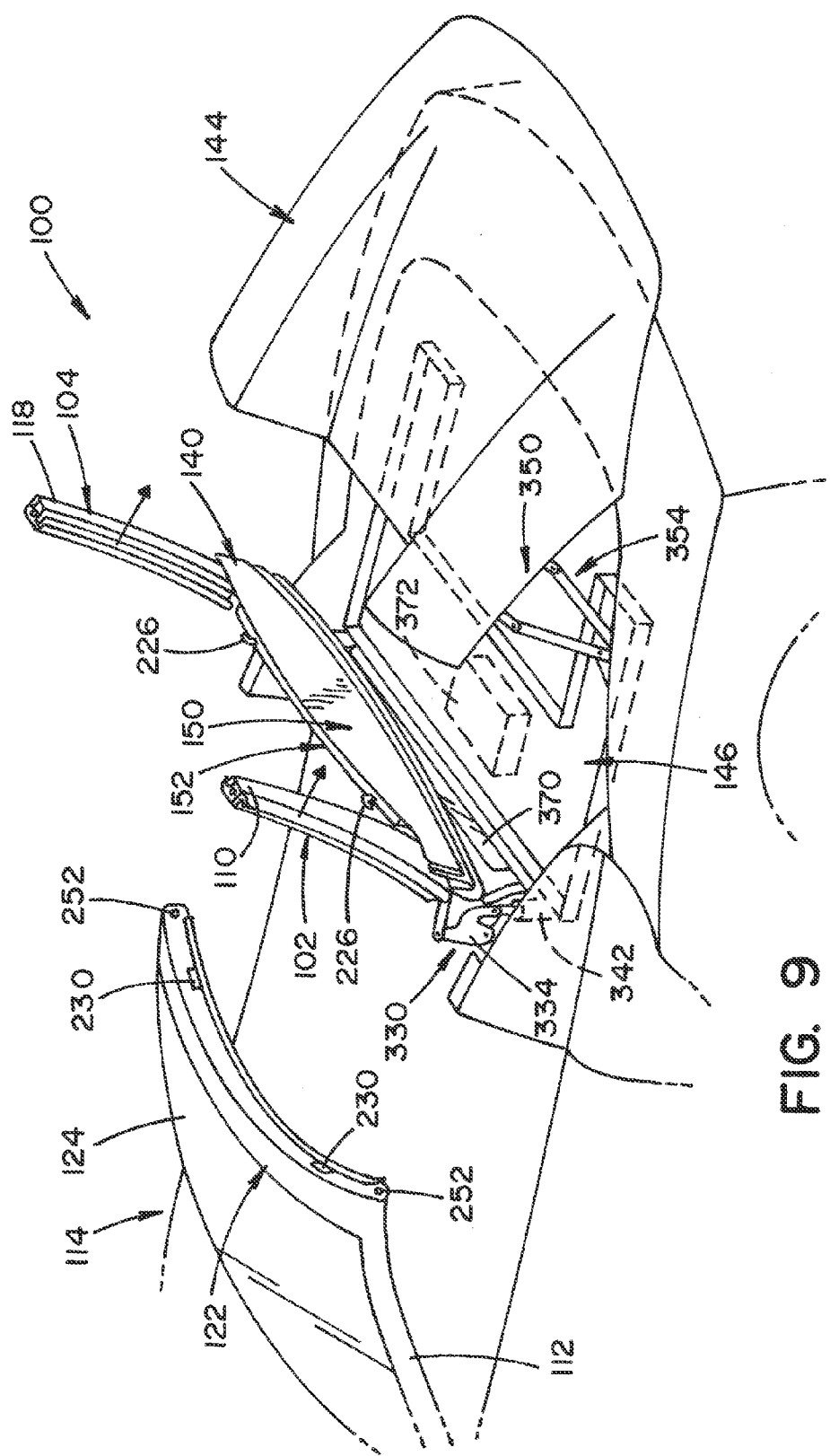
Figure 10:
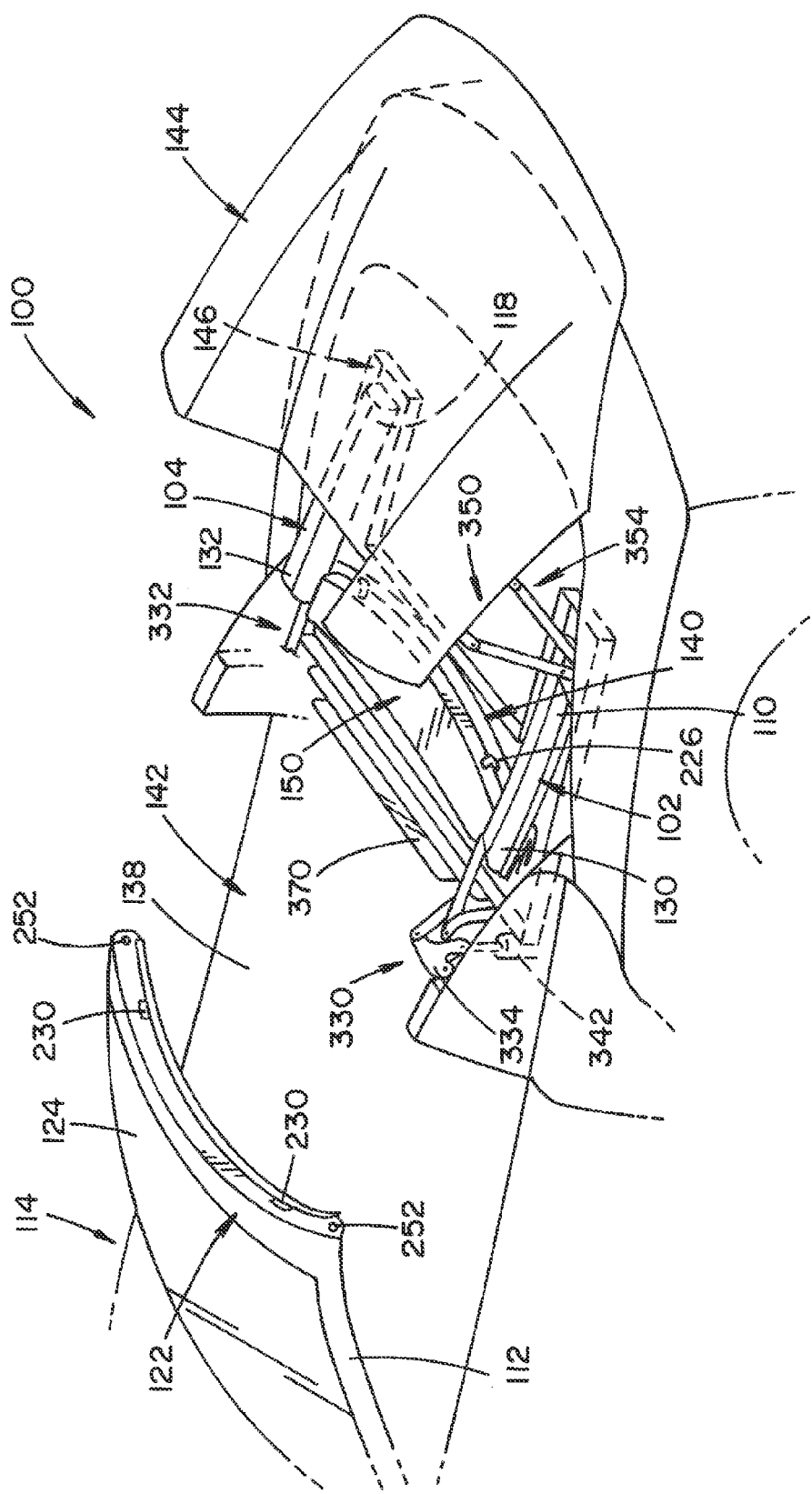
Figure 11:
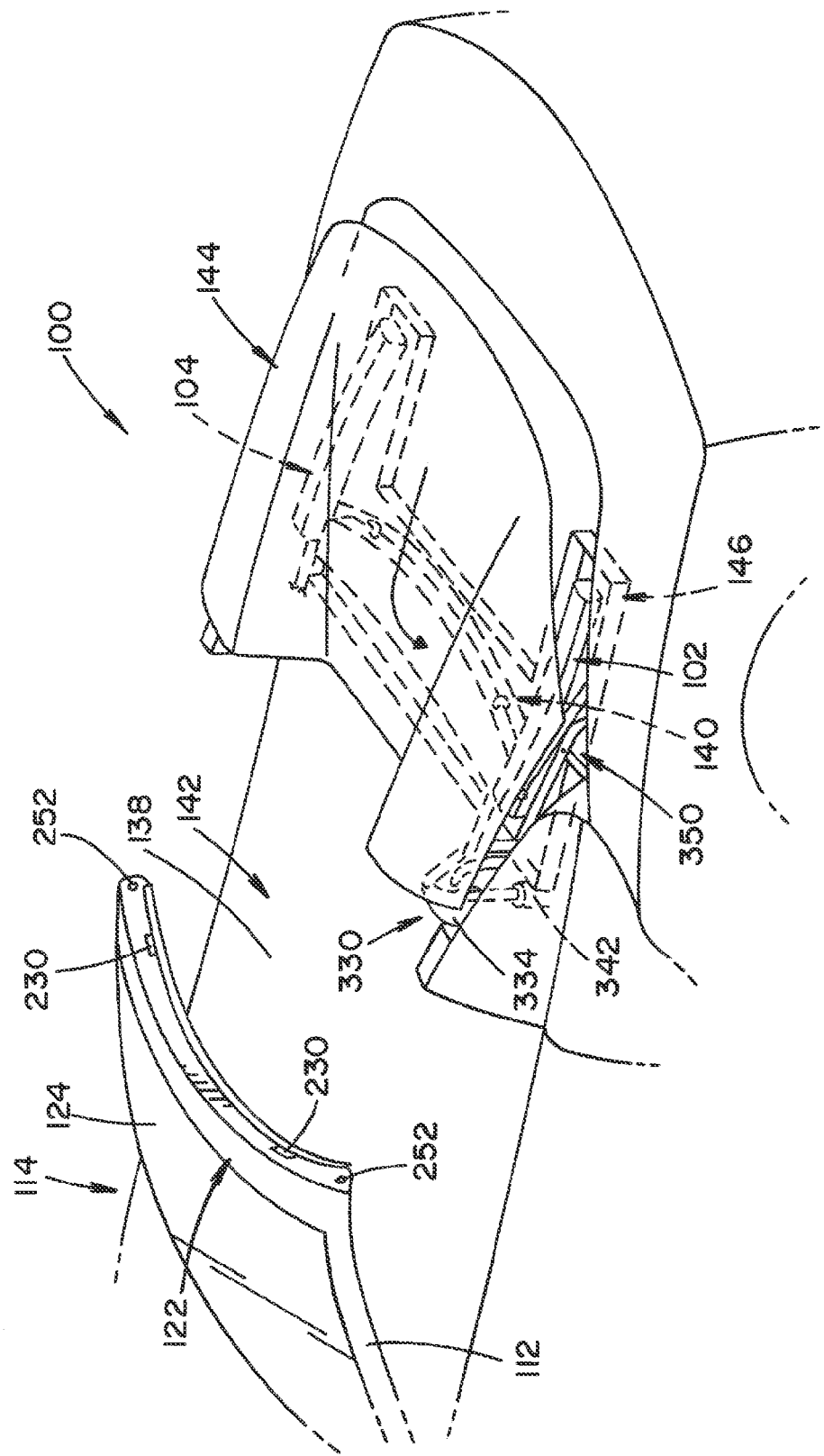

The exemplary convertible system 100 further includes a retractable roof member 140 which is movable between a closed position (FIG. 1), at least one pre-defined intermediate opened position (FIG. 2), and a fully opened position (FIG. 3). As depicted in FIG. 4, the roof member 140 together with the pair of side rails 102, 104 and the rear roof support 126 are further movable to a stowed position rearward of a vehicle occupant cabin 142, which typically includes vehicle seats (not shown). As schematically depicted in FIGS. 5-11, a rear covering panel (i.e., a tonneau cover 144) is positioned rearward of the pair of side rails 102, 104. The rear covering panel 144 is movable from a closed position (FIG. 5) covering a storage compartment 146 to an opened position (FIG. 7). As will be described below, the roof member 140 together with the pair of side rails 102, 104 and the rear roof support 126 are located in the storage compartment 146 and covered by the covering panel 144 in the stowed position.

Figure 12:
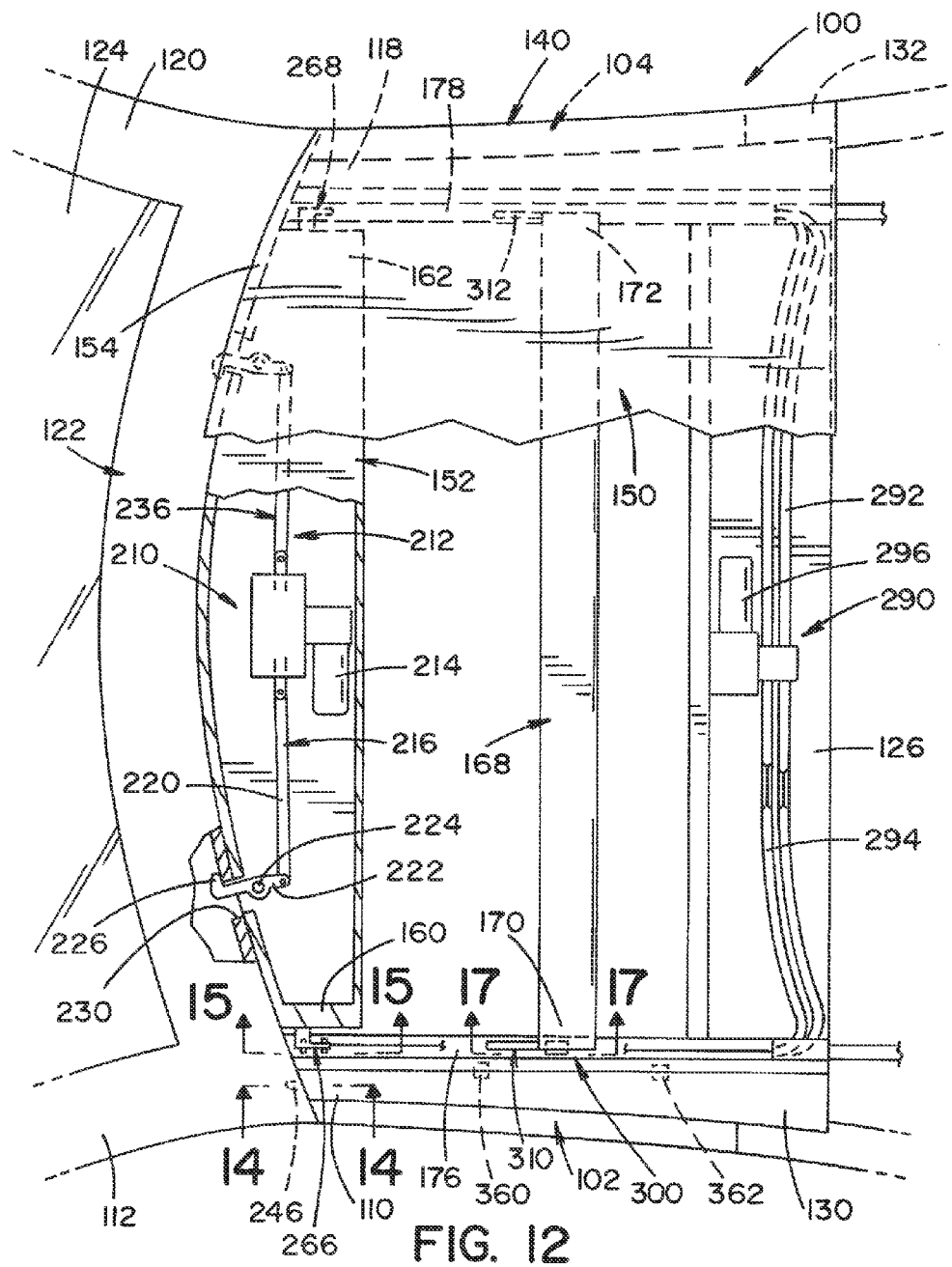
FIG. 12 is a schematic top view partially in cross-section of the exemplary convertible system of FIG. 1.

The retractable roof member 140 includes a flexible, foldable roof panel 150 (e.g., a foldable textile roof panel) and a panel header 152 secured to and covered by a forward end portion 154 of the roof panel 150. The roof panel 150 is sized to cover the roof opening 138 and is movably coupled to the side rails 102, 104 via lateral end portions 160, 162 (FIG. 12) of the panel header 152, which are positioned outboard of the roof opening 138 and moveably coupled to the respective side rails 102, 104 (FIG. 12). With reference to FIG. 12, the exemplary roof member 140 can further include a transverse roof support 168 covered by the roof panel 150 and located forward of the rear roof support 126 and spanning between the side rails 102, 104. Similar to the panel header 152, the transverse roof support 168 has lateral end portion 170, 172 slidably coupled to the respective side rails 102, 104. With reference back to FIGS. 2-4, the panel header 152 operably engages the transverse roof support 168 when the roof member 140 is retracted to the fully opened position and causes the transverse roof support 168 to move substantially simultaneous with the panel header 152 to the fully opened position and to the stowed position of the roof member 140.

Figure 13:
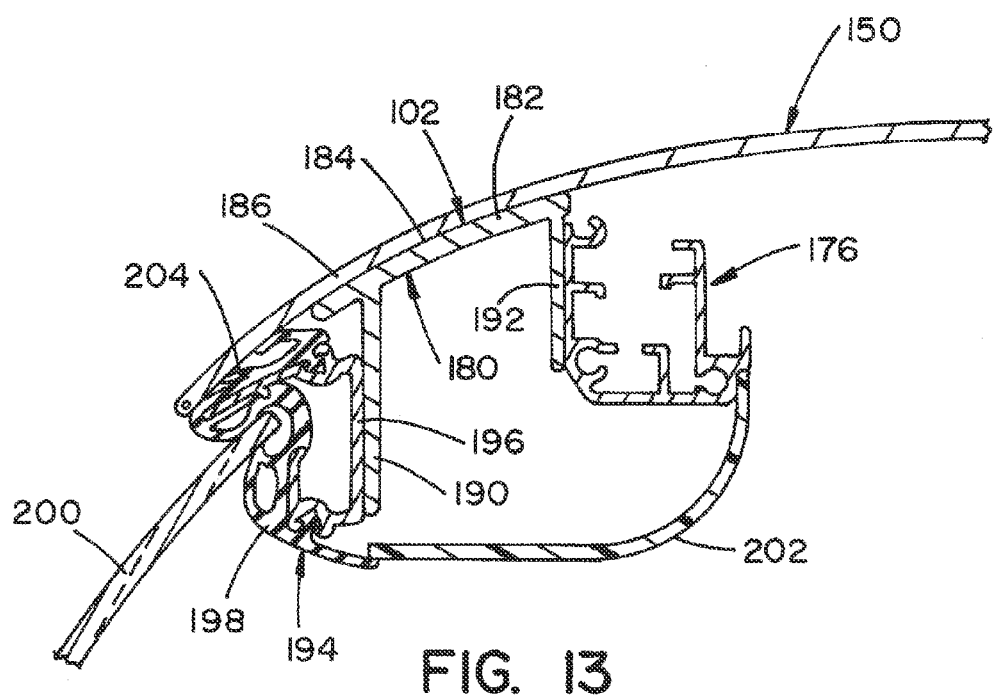
FIG. 13 is a cross-sectional view of the convertible system of FIG. 12.

Each of the side rails 102, 104 is provided with a respective track 176, 178 elongated in a predominantly fore-and-aft direction of the vehicle. FIG. 13 is a cross-section of side rail 102, and it should be appreciated that side rail 104 is of a similar configuration. The side rail 102 can include a structural member 180 having an upper base portion 182 defining a support surface 184 for a lateral end portion 186 of the roof panel 150. First and second legs 190, 192 can depend from the base portion 182. A weatherstrip 194 is provided outboard of the first leg and includes a support 196 secured to the first leg 190 and a seal member 198 secured to the support 196. As is well known in the art, the seal member is configured to sealingly engage a side window 200. The seal member further includes an upper seal portion 204 for sealingly engaging the lateral end portion 186 of the roof panel 150 in each of the closed position (FIG. 1), the at least one pre-defined intermediate opened position (FIG. 2), and the fully opened position (FIG. 3). The elongated track 176 is mounted to the inboard second leg 192. Further, a decorative trim panel 202 covers the structural member 180 and a lower portion of the elongated track 176.

With reference back to FIG. 12, the exemplary convertible system 100 further includes a roof member latch mechanism 210 mounted to the panel header 152 for releasably attaching the panel header to the front structural header 122. As depicted, and according to one aspect of the present disclosure, the latch mechanism 210 includes a linkage 212 operably driven by an electric motor 214. The electric motor 214 can be operably controlled by a vehicle controller (not shown) and a vehicle occupant accessible open/close switch (not shown) located in the passenger compartment of the vehicle. The controller may take the form of any processing unit, such as a computer processing unit. Further, the controller may be a single processing unit, or may take the form of multiple processing units. The linkage 212 includes at least one arm 216 having a first part 220 directly coupled to the motor 214 and a second part 222 coupled to the first part 220 and pivotable about a pin 224 secured to the panel header 152. Provided at an end portion of the second part 222 is an engagement member or finger 226 which can extend through a corresponding opening 230 in the front structural header 122. In operation, actuation of the motor 214 causes the first part 220 of the arm 216 to move laterally and this lateral movement, in turn, causes the second part 222 of the arm 216 to pivot about the pin 224. This pivoting of the second part 222 disengages the finger 226 from the front structural header 122 and allows the finger to move through the opening 230 as the roof member 140 moved from the closed position toward one of the other defined positions. It should be appreciated, and as depicted in FIG. 12, the linkage 212 can include a pair of arms 216, 236, the arm 236 having a configuration and being operable similar to arm 216. It should also be appreciated that alternative roof member latching mechanisms for securing the panel header 152 to the front structural header 122 in the closed position of the roof member 140 are contemplated. The roof member latch mechanism 210 and the underside of panel header 152 can be aesthetically covered by interior trim panels such as a headliner which can include an overhead center console and lighting system, and garnish moldings, which can be made of a polymeric material or other known fabric covered substrates.

Figure 14:
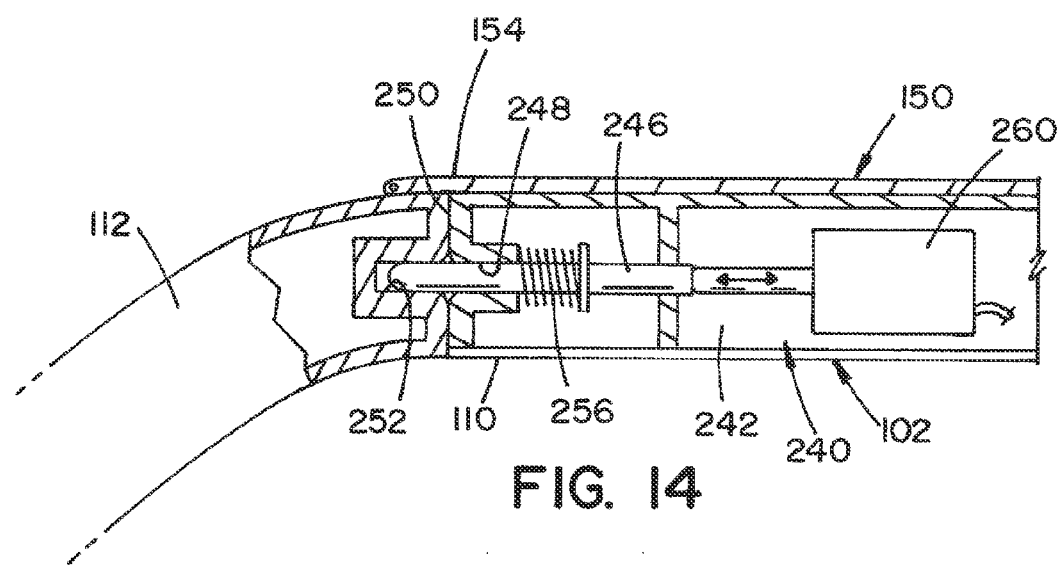
FIG. 14 is a cross-sectional view of the convertible system taken along line 14-14 of FIG. 12.

As indicated previously, the pair of side rails 102, 104 are movable together with the roof member 140 and the rear roof support 126 to the storage compartment 146 and covered by the covering panel 144 in the stowed position. To this end, a side rail latching mechanism (only side rail latching mechanism 240 is depicted) is mounted to each side rail 102, 104 for releasably attaching the respective forward end 110, 118 of each side rail 102, 104 to one of the structural pillars 112, 120. With reference to FIG. 14, according to one aspect of the present disclosure, the side rail latching mechanism 240, which can be housed in an interior hollow portion 242 of the side rail forward end 110, includes a pin 246 directed in the forward travel direction of the vehicle. The pin 246 is movable through an opening 248 provided in an end face 250 of the side rail forward end 110 and is receivable in a complementary recess 252 provided in the structural pillar 112. The pin 246 is biased inwardly of the side rail forward end 110 via a biasing member 256, such as the depicted spring. This allows the pin 246 to move into the interior portion 242 of the side rail 102 as the side rail is moved to the stowed position. A solenoid or electric motor 260 can be provided for driving the pin 246 toward the structural pillar 112. The solenoid 260 can be operably controlled by the vehicle controller (not shown) so that the solenoid 260 is de-energized when it is sensed by the controller that the roof member 140 is to be moved from the fully opened position to the stowed position and again energized when the roof member is back in the fully opened position. It should be appreciated that instead of the pins, it is also possible to provide other suitable side rail latching mechanisms.

As described previously, the lateral end portions 160, 162 of the panel header 152 are configured to slidably couple the roof panel 140 to elongated tracks 176, 178 of the respective side rails 102, 104. With reference back to FIG. 12, guide members 266, 268 are mounted to the respective lateral end portions 160, 162 of the panel header 152 and are slidable in the respective elongated tracks 176, 178. The guide members are of a similar construction, and as shown in FIG. 15, guide member 266 can include a bracket 270 mounted to the end portion 160. According to one aspect, the bracket 270 can be provided with a first guide wheel 272 and a second guide wheel 274 offset from the first guide wheel 272. The first guide wheel 272 is movably received in a first elongated channel 276 of the elongated track 176 and the second guide wheel 274 is movably received in a second elongated channel 278 of the elongated track 176. As depicted, each of the first and second channels 276, 278 includes a respective forward end section 280, 282 curved downwardly and toward the end face 250 of the side rail 102. It should be appreciated that the curved end sections 280, 282 of the elongated track 176 move the panel header 152 together with the forward end portion 154 of the roof panel 150 downwardly and forwardly into engagement with the front structural header 122 in the closed position of the roof member 140. It should also be appreciated, and as shown in FIG. 16, that the curved end sections 280, 282 of the elongated track 176 move the panel header 152 together with the forward end portion 154 of the roof panel 150 upwardly and rearwardly as the roof member 140 is retracted from the closed position. Further, with the offset arrangement of the first and second guide wheels 272, 274 on the bracket 270, as the guide member 266 is moved in the elongated track 176 toward a rear of the vehicle a rear part 286 of the panel header 152 is inclined, which, as shown in FIGS. 2 and 3, allows the textile roof panel 150 to compactly fold beneath the panel header 152. It should be appreciated that alternative configurations for the elongated tracks 176, 178 and the guide members 266, 268 are contemplated for moving the roof member between the closed position and the fully opened position.

With reference back to FIG. 12, the rear roof support 126 has a roof member drive mechanism 290 mounted thereto. The drive mechanism 290 is configured to move the roof member 140 between the closed position and fully opened position. In the depicted embodiment, the drive mechanism 290 includes first and second elongated and Bowden cables 292, 294 which are operably driven by an electromagnetic actuator such as an electric motor 296 having a gear box engagably pushing and pulling the cables 292, 294 depending on the desired movement of the roof member 140. One end of each of the first and second cables 292, 294 is secured to the bracket 270 of the guide member 266 (FIGS. 15 and 16), and the other end of each of the first and second cables 292, 294 is secured to the bracket of the guide member 268. A pulley (only pulley 298 is shown) is provided at the forward end portion 110, 118 of each side rail 102, 104 for the second cable 294. Thus, to retract the roof member 140, the electric motor 296 is energized to pull the first cable 292, and to move the roof member back to the closed position, the electric motor 296 is energized to pull the second cable 294. Again, the electric motor 296 can be operably controlled by the vehicle controller (not shown) and a vehicle occupant accessible open/close switch (not shown). The electric motor 296 can be de-energized, for example, when corresponding Hall effect sensors, potentiometer or limit switch sensors, which are in signal communication with the vehicle controller (not shown), sense that the closed, fully opened, or the at least one predefined intermediate opened positions have been reached. Further, the drive mechanism 290 and the underside of rear roof support 126 can be aesthetically covered by interior trim panels and garnish moldings.

As indicated previously, the panel header 152 operably engages the transverse roof support 168 when the roof member 140 is retracted to the fully opened position and causes the transverse roof support 168 to move substantially simultaneous with the panel header 152 to the fully opened position and to the stowed position of the roof member 140. To this end, the lateral end portions 170, 172 of the transverse support 168 are slidably coupled to the respective elongated tracks 176, 178 via guide members (FIG. 12). FIGS. 17 and 18 depict the lateral end portion 170 of the transverse roof support 168 having guide member 300 slidingly received in the second channel 278. The guide member 300 can include a bracket 302 for rotatably supporting guide wheels 304, 306, which are received in the second channel 278. According to the present embodiment, lifting mechanisms 310, 312 interconnect the respective lateral end portions 170, 172 of the transverse support 168 to the guide members (FIG. 12). Lifting mechanism 310 is depicted in FIGS. 17 and 18, and it should be appreciated that the lifting mechanisms 310, 312 can have a similar construction. Lifting mechanism 310 includes a biasing member 314 having a first end portion 316 connected to the guide member 300, a second end portion 318 connected to the lateral end portion 170, and a curved portion 320 located forward of the first and second end portions 316, 318. The biasing member 314 is maintained in a compressed position by the tautness of the roof panel 150 in the closed position of the roof member 140 (FIG. 17). As the roof member 140 is retracted, the roof panel 150 begins to fold under the rear part 286 of the panel header 152. This, in turn, relaxes the roof panel 150 thereby allowing the biasing member 314 to move to an expanded position (FIG. 18). As depicted, the curved portion 320 can be canted upwardly toward the roof panel 150, which ensures upwardly movement of the lifting mechanism 310. As the panel header 152 approaches the elevated transverse support 168, the rear part 286 of the panel header slider over the transverse support 168 causing the transverse support 168 to move together with the panel header 152 to the fully opened position of the roof member 140 (FIG. 2). As depicted in FIG. 3, in the fully opened position, both the panel header 152 and the transverse support 168 are located over the rear support 126. Further, with the transverse support 168 being at least partially lifted with the panel header 152 due to the lifting mechanisms 310, 312, the roof panel 150 continues to compactly fold substantially beneath the panel header 152.

With reference back to FIGS. 6-11, the convertible system 100 further includes a linkage 330, 332 operably connected to the rear end portion 130, 132 of each respective side rail 102, 104. The linkages 330, 332 move the roof member 140 together with the side rails 102, 104 and the rear support 126 to the stowed position located in the storage compartment 146. In the depicted embodiment, each linkage 330, 332 can include a respective first driven link 334, 336 and a respective second follower link 338, 340. An electric or hydraulic drive 342, 344 can be operably connected to each respective first link 334, 336. Again, in the fully opened position, the roof member and transverse support are arranged at least partially over the rear roof support, and actuation of the drives 342, 344 move the linkages 330, 332 lowering the roof member in this nested state into the storage compartment 146. It should be appreciated that the drives 342, 344 can be operably controlled by the vehicle controller (not shown) and a vehicle occupant accessible open/close switch (not shown). Actuation of the drives 342, 344 is stopped, for example, when corresponding Hall effect sensors, potentiometer or limit switch sensors, which are in signal communication with the vehicle controller (not shown), sense that proper placement in the storage compartment or movement back to the fully opened position is reached. It should also be appreciated that alternative configurations of the linkages 330, 332 are contemplated.

FIGS. 5-11 depict a drive mechanism 350 for moving the rear covering panel or tonneau cover 144 from the closed position (FIG. 5) covering the storage compartment 146 to the opened position (FIG. 7). In the opened position, the roof member 140 together with the side rails 102, 104 and the rear support 126 can rotate freely without there being any danger of the side rails 102, 104 colliding with tonneau cover 144. The drive mechanism 350 can include an electric motor or a hydraulic cylinder 352 for driving a linkage 354. Again, the drive mechanism can be operably controlled by the vehicle controller (not shown) and a vehicle occupant accessible open/close switch (not shown), and sensors in signal communication with the vehicle controller can be provided to stop the drive mechanism when the opened and closed positions of the tonneau cover 144 have been reached. Although only one drive mechanism 350 is depicted, it should be appreciated that the convertible system 100 can include a pair of drive mechanisms for moving the tonneau cover 144.

As indicated previously, the exemplary convertible system 100 includes at least one pre-defined intermediate opened position (FIG. 2). At least one position sensor is located on at least one side rail for determining whether the roof member 140 is in the at least one pre-defined intermediate opened position. The at least one position sensor is operably connected to the vehicle controller and/or drive mechanism 290 so that the drive mechanism 290 automatically stops movement of the roof member 140 at the at least one pre-defined intermediate opened position. As schematically depicted in FIG. 12, the at least one position sensor includes a first position sensor 360 and, optionally, a second position sensor 362, each position sensor located in the side rail 102. With the first and second position sensors 360, 362, the roof member 140 can be opened to at least two pre-defined intermediate opened positions. For example, one pre-defined intermediate opened position can be at an approximate 150 mm opened position and another pre-defined intermediate opened position can be at an approximate 300 mm opened position. It should also be appreciated that program logic can be provided with the controller, which allows the operator to preset the desired intermediate opened position(s) of the roof member 140 and then automatically determines the current opened state of the roof member 140 via the position sensor(s). Further, the various roof opened states of the roof member 140 can be visually shown on the dashboard, for example, in the form of separate operating buttons or in the form of a screen display.

A back window 370 of the vehicle is operably movable from a closed position (FIG. 1) to an opened position (FIG. 4) in the vehicle body without requiring simultaneous movement of the roof member 140 (i.e., independent of the movement of the roof member). The back window 370 can move via an elongated and generally flexible Bowden cable (not shown). A back window electric motor 372 (schematically depicted in FIGS. 6-9) engagably pushes and pulls cable, via a gear box, which acts to advance and retract back window relative to the vehicle, responsive to the controller (not shown) and a vehicle occupant accessible open/close switch (not shown). When it is desired to raise back window from its opened position to its closed position, the controller causes the back window motor to push cable, and thereby raise the back window 370.

As is evident from the foregoing, the present disclosure relates to a convertible system 100 for a vehicle which has the ability to act as a textile folding sunroof at anytime during specified vehicle operations, but also act as a convertible top having the ability to completely fold down and rearward of the vehicle occupant to a stowed position covered by a vehicle body panel 144. A roof member 140 can be opened to at least two pre-defined opening positions by activation of a vehicle occupant accessible open/close switch provided in the vehicle. After opening the roof member 144 to its fully opened position, continuing to hold the roof open switch will engage the mechanisms 330, 350 required to fold the roof member 144 into the rear storage compartment 146. The convertible roof rails 102, 104 are released from the A-pillars 112, 120 and the entire top is moved to its stowed position. Upon completing movement to the stowed position, the body panel 144 will close to a fully closed position. The right, left and back windows can operate independently of the roof member 140 and of each other. The back window 370 can act as a wind deflector when the roof member 140 is in the stowed position.

While the exemplary convertible system has been disclosed herein, it should be appreciated that other variations will still fall within the scope of the present disclosure. For example, rods or pulley-type cables can be employed in place of the Bowden cables. Gears of the motors may directly contact a rack-like track, or a jack screw, tape drive or hydraulic mechanisms can also be provided for any of the moving components. Additionally, the number and arrangement of linkages, brackets, switches and electric motors can be varied as long as the functions of the present disclosure are achieved. Furthermore, the roof member and back window can be employed independently of each. Also various presently unforeseen or unanticipated alternatives, modifications, variations or improvements therein may be subsequently made by those skilled in the art which are also intended to be encompassed by the following claims.

What is claimed is:

1. A convertible system for a vehicle comprising:
 a pair of movable structural side rails, each side rail being connected at a forward end to a structural pillar of a vehicle body and hinged via a linkage at a rear end;
 a front structural header spanning between the forward ends of the side rails, the side rails together with the front structural header defining a roof opening;
 a side rail latching mechanism mounted to at least one side rail for releasably attaching the forward end of the at least one side rail to one of the structural pillars;
 a roof member including a flexible, foldable roof panel sized to cover the roof opening and a panel header secured to and covered by a forward end portion of the roof panel, the panel header having a forward part and a rear part, and lateral end portions movably coupled to the side rails, the roof member being movable between a closed position, at least one pre-defined intermediate opened position, and a fully opened position;
 a transverse roof support located rearward of the panel header and spanning between the side rails, the roof panel covering the transverse roof support, the rear part of the panel header track guided to pivot upwardly relative to the side rails and slide over the transverse roof support as the roof member is retracted to the fully opened position, the transverse roof support adapted to move with the panel header to the fully opened position, the roof member together with the pair of side rails and transverse roof support being further movable to a stowed position rearward of a vehicle occupant cabin; and
 a roof member latch mechanism mounted to the panel header for releasably attaching the forward part of the panel header to the front structural header.

2. The convertible system of claim 1, further including an elongated track mounted to each of the pair of side rails, the lateral end portions of the panel header configured to slidably couple the roof panel to the elongated tracks.

3. The convertible system of claim 2, wherein the lateral end portions of the roof panel are positioned outboard of the roof opening.

4. The convertible system of claim 2, further including a rear covering panel positioned rearward of the pair of side rails, the rear covering panel movable from a closed position covering a storage compartment to an opened position, the roof member together with the side rails being located in the storage compartment and covered by the covering panel in the stowed position.

5. The convertible system of claim 4, further including a rear roof support spanning between and connected to the rear end portions of the side rails, the rear roof support being movable with the side rails to the stowed position, the rear roof support having a drive mechanism mounted thereto, the drive mechanism being configured to move the roof member between the closed position and fully opened position.

6. The convertible system of claim 1, wherein lateral end portions of the transverse support are slidably coupled to the elongated tracks.

7. The convertible system of claim 5, wherein in the fully opened position, the roof member and transverse support are arranged at least partially over the rear roof support, the linkages then lowering the roof member in this nested state into the storage compartment.

8. The convertible system of claim 4, further including a back window operably moving from a closed position to an opened position without requiring simultaneous movement of the roof member.

9. The convertible system of claim 4, wherein the covering panel is a tonneau cover.

10. The convertible system of claim 4, wherein the roof panel is formed of a textile material.

11. The convertible system of claim 10, further including a drive mechanism operably associated with the roof member, the drive mechanism being configured to move the roof member between the closed position and fully opened position, the textile material compactly folding substantially beneath the panel header as the roof member is moved from the closed position to the fully opened position.

12. The convertible system of claim 11, wherein the roof member can be opened to at least two pre-defined intermediate opened positions and further including at least one position sensor located on at least one side rail for determining whether the roof member is in one of the intermediate opened positions, the at least one position sensor being operably connected to the drive mechanism so that the drive mechanism automatically stops movement of the roof member at each of the pre-defined intermediate opened positions.

13. A convertible system for a vehicle comprising:
 a pair of movable structural side rails, each side rail being connected at a forward end to a structural pillar of a vehicle body and hinged via a linkage at a rear end;
 a front structural header spanning between the forward ends of the side rails and a rear roof support spanning between and connected to rear end portions of the side rails, the side rails together with the front structural header and rear roof support defining a roof opening;
 a side rail latching mechanism mounted to each side rail for releasably attaching the forward end of each side rail to one of the structural pillars;
 a retractable roof member including a foldable textile roof panel sized to cover the roof opening and a panel header secured to and covered by a forward end portion of the roof panel and movably coupled to the side rails, the roof member being movable between a closed position, at least one pre-defined intermediate opened position, and a fully opened position, the roof member together with the pair of side rails and the rear roof support being further movable to a stowed position rearward of a vehicle occupant cabin;
 a transverse roof support located rearward of the panel header and having lateral end portions connected to guide members movably coupled to the side rails, the panel header operably engaging the transverse support when the roof member is retracted causing the transverse support to move with the panel header, the transverse roof support being biased upwardly relative to the side rails and a rear part of the panel header adapted to slide over the transverse roof support allowing the roof panel to be compactly folded substantially beneath the panel header in the fully opened position;

a roof member latch mechanism mounted to the panel header for releasably attaching the panel header to the front structural header; and a drive mechanism mounted to the rear roof support and configured to retract the roof member, the roof panel being compactly folded substantially beneath the panel header as the roof member is retracted.

14. The convertible system of claim 13, further including a back window movable between a closed position and an opened position independent of the movement of the roof member.

15. The convertible system of claim 13, further including a rear storage compartment covered by a tonneau cover movable from a closed position covering the storage compartment to an opened position, the roof member together with the side rails and rear roof support being located in the storage compartment in the stowed position and covered by the tonneau cover.

16. A convertible system for a vehicle comprising:

a pair of movable structural side rails, each side rail being connected at a forward end to a structural pillar of a vehicle body and hinged via a linkage at a rear end;

a front structural header spanning between the forward ends of the side rails and a rear roof support spanning between and connected to rear end portions of the side rails, the side rails together with the front structural header and rear roof support defining a roof opening;

a side rail latching mechanism mounted to each side rail for releasably attaching the forward end of each side rail to one of the structural pillars;

a retractable roof member including foldable textile roof panel sized to cover the roof opening and a panel header secured to and covered by a forward end portion of the roof panel and movably coupled to the side rails, the roof member being movable between a closed position, at least one pre-defined intermediate opened position, and a fully opened position, a rear part of the panel header track guided to pivot upwardly relative to the side rails as the panel header is retracted, the roof member together with the pair of side rails and the rear roof support being further movable to a stowed position rearward of a vehicle occupant cabin;

a transverse roof support having lateral end portions connected to guide members movably coupled to the side rails, the panel header operably engaging the transverse roof support when the roof member is retracted causing the transverse roof support to move with the panel header, the transverse roof support being biased upwardly relative to the side rails and the rear part of the panel header sliding over the transverse roof support allowing the roof panel to be compactly folded substantially beneath the panel header;

a roof member latch mechanism mounted to the panel header for releasably attaching the panel header to the front structural header;

a drive mechanism mounted to the rear roof support and configured to retract the roof member; and at least one position sensor located on at least one side rail for determining whether the roof member is in the at least one pre-defined intermediate opened position, the at least one position sensor being operably connected to the drive mechanism so that the drive mechanism automatically stops movement of the roof member at the at least one pre-defined intermediate opened position.

17. The convertible system of claim 16, further including a rear storage compartment covered by a tonneau cover movable from a closed position covering the storage compartment to an opened position, the roof member together with the side rails and rear roof support being located in the storage compartment in the stowed position and covered by the tonneau cover.

* * * * *